United States Patent
Sahagun et al.

(10) Patent No.: US 9,175,137 B2
(45) Date of Patent: Nov. 3, 2015

(54) METHOD FOR PRODUCING CYANURATE NETWORKS VIA INDUCTIVE HEATING OF SILICA-COATED MAGNETIC NANOPARTICLES

(71) Applicant: The United States of America as Represented by the Secretary of the Air Force, Washington, DC (US)

(72) Inventors: Christopher Sahagun, Lancaster, CA (US); Andrew Guenthner, Lancaster, CA (US); Joseph Mabry, Lancaster, CA (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 145 days.

(21) Appl. No.: 14/089,316

(22) Filed: Nov. 25, 2013

(65) Prior Publication Data
US 2014/0148568 A1 May 29, 2014

Related U.S. Application Data (60) Provisional application No. 61/729,730, filed on Nov. 26, 2012.

(51) Int. Cl.
C08G 73/06 (2006.01)

(52) U.S. Cl.
CPC .................. C08G 73/0655 (2013.01)

(58) Field of Classification Search
CPC combination set(s) only.
See application file for complete search history.

(56) References Cited

U.S. PATENT DOCUMENTS

| | | | | |
|---|---|---|---|---|
| 4,472,455 A * | 9/1984 | Kohl et al. | | 427/548 |
| 4,709,008 A | 11/1987 | Shimp | | |
| 5,119,228 A * | 6/1992 | Fang | | 359/245 |
| 5,206,321 A * | 4/1993 | Hefner et al. | | 526/256 |
| 5,284,968 A | 2/1994 | Craig, Jr. | | |
| 5,744,557 A * | 4/1998 | McCormick et al. | | 526/171 |
| 5,922,435 A * | 7/1999 | Lee et al. | | 428/98 |
| 5,969,036 A * | 10/1999 | Dershem | | 524/779 |
| 8,557,329 B2 | 10/2013 | Dai et al. | | |
| 8,565,892 B2 | 10/2013 | Nayfach-Battilana | | |
| 2012/0208026 A1* | 8/2012 | Zhou et al. | | 428/404 |

OTHER PUBLICATIONS

Prokopec et al. Characterizaton of advances cyanate ester/epoxy insulation systems before and after irradiation. Fusion Engineering and Design. 85 (2010), 227-233.*
Mate et al. Microstructure and Microtribology of Polymer Surfaces: Chapter 25, pp. 405-417. ACS Symposium Series, vol. 741 Publication Date (Print): Jul. 23, 2009.*
M. C. Davis et al., "Polycyanurate networks from anethole dimers: synthesis and characterization," J. Polym. Sci. Polym. Chem., vol. 50 (2012) 4127-2136.

(Continued)

Primary Examiner — Sanza McClendon
(74) Attorney, Agent, or Firm — AFMCLO/JAZ; Chastity Whitaker

(57) ABSTRACT

A method for curing a macromolecular cyanurate network. The method of curing includes suspending a plurality of functionalized silica-coated magnetic nanoparticles in a resin mixture, which includes cyanate ester monomers, cyanate ester oligomers, or both. After a static magnetic field is applied to the plurality of functionalized silica-coated magnetic nanoparticles in the resin mixture, an alternating electromagnetic field (having frequency ranging from about 1 kHz to about 10 MHz) is imposed for a cure time.

18 Claims, 9 Drawing Sheets

(56) References Cited

OTHER PUBLICATIONS

Hamerton et al., "Studies on a dicyanate containing four phenylene rings and polycyanurate blends. 2. Application of mathematical models to the catalyzed polymerization process," Polymer, vol. 44 (2003) 4839-4852.

Hubbard et al., "Curing of a bisphenol E based cyanate ester using magnetic nanoparticles as an internal heat source through induction heating," ACS Applied Materials & Interfaces, vol. 4 (2013) 11329-11335.

Zhao et al., "Autocatalytic curing kinetics of thermosetting polymers: A new model based on temperature dependent reaction orders," Polymer, vol. 51 (2010) 3814-3820.

Badrinarayanan et al., "Zirconium tungstate/cyanate ester nanocomposites with tailored thermal expansivity," Composites Science and Technology, vol. 71 (2011) 1385-1391.

Hudson and Nelson, University Physics 2d ed. 754 (Saunders College Publishing: Philadelphia 1990), p. 754.

* cited by examiner

METHOD FOR PRODUCING CYANURATE NETWORKS VIA INDUCTIVE HEATING OF SILICA-COATED MAGNETIC NANOPARTICLES

Pursuant to 37 C.F.R. §1.78(a)(4), this application claims the benefit of and priority to prior filed Provisional Application Ser. No. 61/729,730, filed Nov. 26, 2012, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to methods of curing resins and, more particularly, to methods of curing cyanurate networks.

BACKGROUND OF THE INVENTION

Macromolecular networks featuring cyanurate cross-links are highly valuable because of the unique combination of outstanding thermal resistance; favorable flame, smoke, and toxicity characteristics; relatively low cost for the level of performance achieved; mechanical toughness; and ease of processing. Liquid dicyanate ester monomers having viscosities below 1 Pa are recognized as affording some of the most affordable and convenient processes for the production of high-strength fiber-reinforced composites. Among these, Primaset® LECy (Lonza Ltd., Basel, Switzerland) is particularly well-known for its low viscosity and for providing a fully cured network with a glass transition temperature in excess of 250° C. Preparation of the liquid di(cyanate ester) resin principally found in Primaset®, 1,1-bis(4-cyaanthophenyl)ethane, is described in U.S. Pat. No. 5,284,968.

One disadvantage of cyanate ester monomers and oligomers for macromolecular network formation is that formation of the networks requires high temperature initiation of thermal polymerization via cyclotrimerization. The addition of metal-containing catalysts can effectively lower this temperature; however, care must be taken when introducing heat into these highly catalyzed systems. For example, excessive heat may cause runaway chemical reactions in which the heat produced by the reaction further accelerates the reaction in a self-reinforcing cycle.

Thus there exists a need for methods by which heat may be introduced into a cyanate ester resin, in a highly controlled manner, to affect thermal cure in a safe and effective manner.

One conventional solution to the controlled introduction of heat into a cyanate ester resin is the use of magnetic nanoparticles, such as those described in U.S. Pat. No. 8,565,892. Magnetic nanoparticles have unique capabilities in polymer nanocomposites, including, the ability to be positioned precisely in three-dimensional space by means of magnetic fields and without physically contacting the monomer or oligomer. Once positioned, significant amounts of heat may be generated by exposing the magnetic nanoparticles to high frequency, alternating electromagnetic fields. Therefore, magnetic nanoparticles have, at least in part, overcome some of the difficulties associated with introducing a controlled quantity of heat to precisely determined locations within a pre-determined region of a cyanate ester resin.

Yet, the conventional magnetic nanoparticles, which are comprised of ferromagnetic or superparamagnetic substances (such as cobalt or iron oxide), exhibit a number of shortcomings. For example, such conventional metallic, magnetic nanoparticles are susceptible to corrosion and may facilitate undesired, catalytic side reactions. One such undesired side reaction is the hydrolytic degradation of macromolecular cyanurate networks. Another such reaction is the decomposition of cyanurate networks at elevated temperatures. Networks containing magnetic nanoparticles may experience decomposition at significantly faster rates at temperatures where, in the absence of such nanoparticles, the decomposition takes place far more slowly, if it all.

Resultantly, there remains a need for methods of effectively isolating the magnetic nanoparticles from the macromolecular cyanurate network while retaining the advantageous ability of introducing a controlled quantity of heat to precisely determined locations within a pre-determined region of a cyanate ester resin sufficient to initiate cure of the resin.

For cyanate ester resins, the required cure temperatures range from about 120° C. to about 250° C., depending on the final properties of the network. These temperatures are significantly higher than the 60° C. that is required for many therapeutic applications. Accordingly, there also remains a need for methods of introducing a quantity of heat sufficient to raise the temperature to a level sufficient to initiate cure.

SUMMARY OF THE INVENTION

The present invention overcomes the foregoing problems and other shortcomings, drawbacks, and challenges of effectively isolating the magnetic nanoparticles from the macromolecular cyanurate network while retaining the advantageous ability of introducing a controlled quantity of heat to precisely determined locations within a pre-determined region of a cyanate ester resin. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention a method for curing a macromolecular cyanurate network includes suspending a plurality of functionalized silica-coated magnetic nanoparticles in a resin mixture, which includes cyanate ester monomers, cyanate ester oligomers, or both. After a static magnetic field is applied to the plurality of functionalized magnetic nanoparticles in the resin mixture, an alternating electromagnetic field is imposed for a cure time. The alternating electromagnetic field has a frequency that ranges from about 1 kHz to about 10 MHz.

In accordance with another embodiment of the present invention, a method for preparing a macromolecular cyanurate network includes coating a plurality of magnetic nanoparticles with silica and suspending the plurality of coated magnetic nanoparticles in a resin mixture, which includes cyanate ester monomers, cyanate ester oligomers, or both. After a static magnetic field is applied to the plurality of coated magnetic nanoparticles in the resin mixture, an alternating electromagnetic field is imposed for a cure time and has a frequency ranging from about 1 kHz to about 10 MHz.

In yet other embodiments of the present invention, a method for preparing a macromolecular cyanurate network includes functionalizing a plurality of magnetic nanoparticles, wherein each of the magnetic nanoparticles of the plurality includes a layer comprising silica. The plurality of functionalized magnetic nanoparticles is suspended in a resin mixture, which includes cyanate ester monomers, cyanate ester oligomers, or both. After a static magnetic field is applied to the plurality of coated, functionalized magnetic nanoparticles in the resin mixture, an alternating electromagnetic field, having a frequency ranging from about 1 kHz to about 10 MHz) is imposed for a cure time. The alternative electromagnetic field is removed and the temperature of the macromolecular cyanurate network adjusted to control a character of the macromolecular cyanurate network.

Additional objects, advantages, and novel features of the invention will be set forth in part in the description which follows, and in part will become apparent to those skilled in the art upon examination of the following or may be leaned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 1:
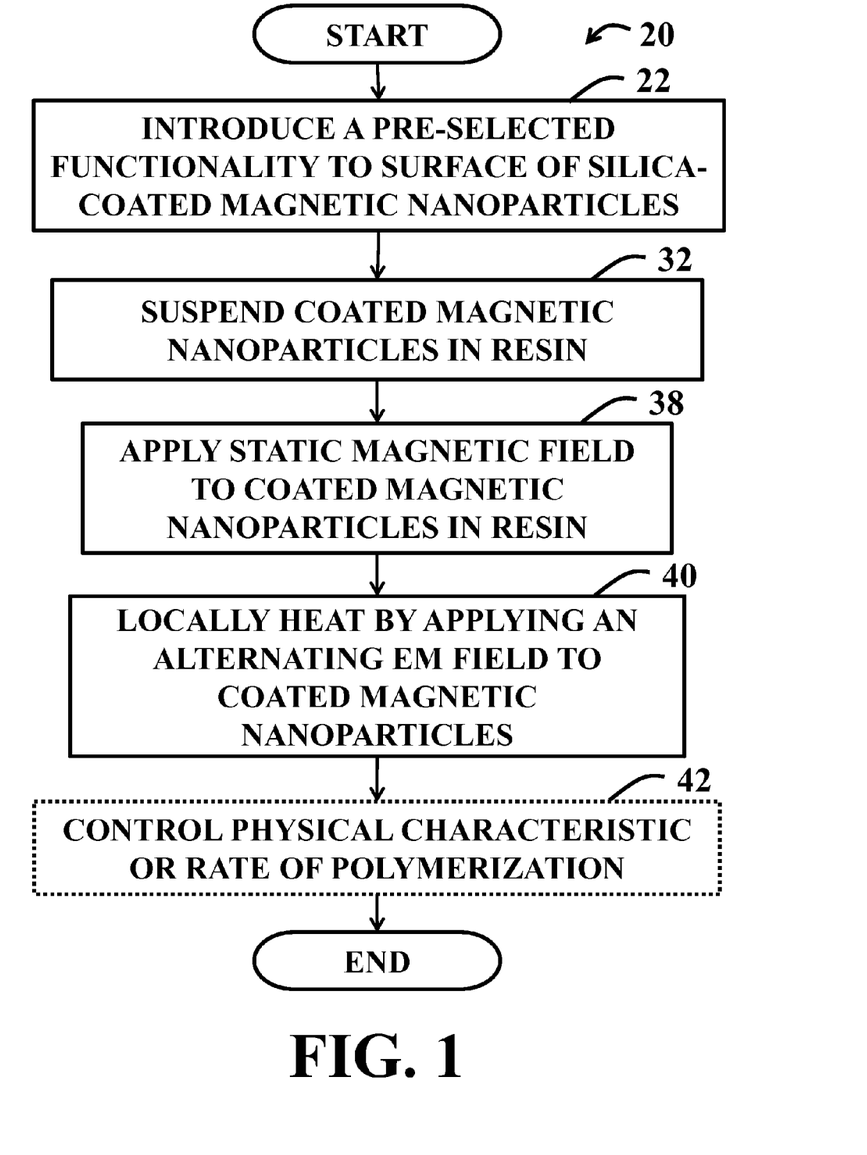
FIG. 1 is a flowchart illustrating a method of curing a macromolecular cyanurate network according to one embodiment of the present invention.
Figure 2A:
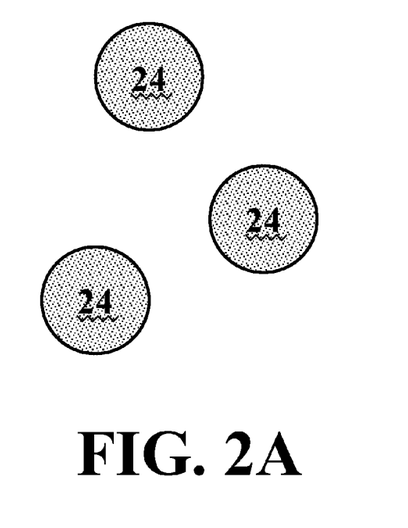
FIGS. 2A-2G are schematic representations of the method of FIG. 1.
Figure 2B:
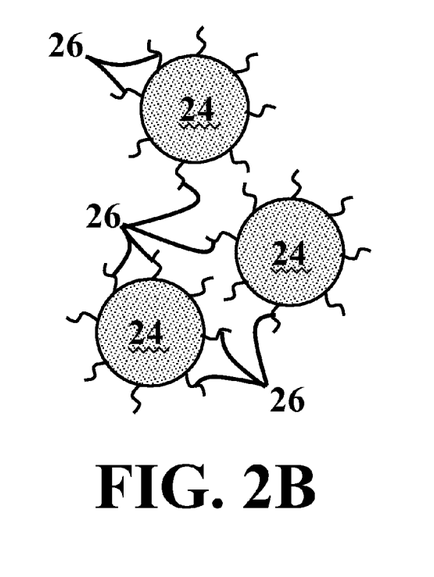

Turning now to the figures, and in particular to FIG. 1, a method of preparing a macromolecular cyanurate network according to an embodiment of the present invention is shown and described in flowchart 20. Accordingly, and in Block 22, silica-coated, magnetic nanoparticles 24 (FIG. 2A) are selected and functionalized with a pre-selected surface functionality 26 (FIG. 2B), such as a plurality of silanol fragments, silyl ether fragments, silane fragments, titanate fragments, zirconate fragments, or combinations thereof that are compatible with cyanate ester monomers and macromolecular cyanurate network. The "core" magnetic nanoparticles 24 (FIG. 2A) may, alternatively, include a conformal layer of silica, for example, by chemical deposition without causing substantial aggregation. The core magnetic nanoparticles 24 (FIG. 2A) may have a diameter ranging from about 1 nm to about 50 nm and the layer of silica may, for example, have a thickness ranging from about 1 nm to about 50 nm.

Figure 2C:
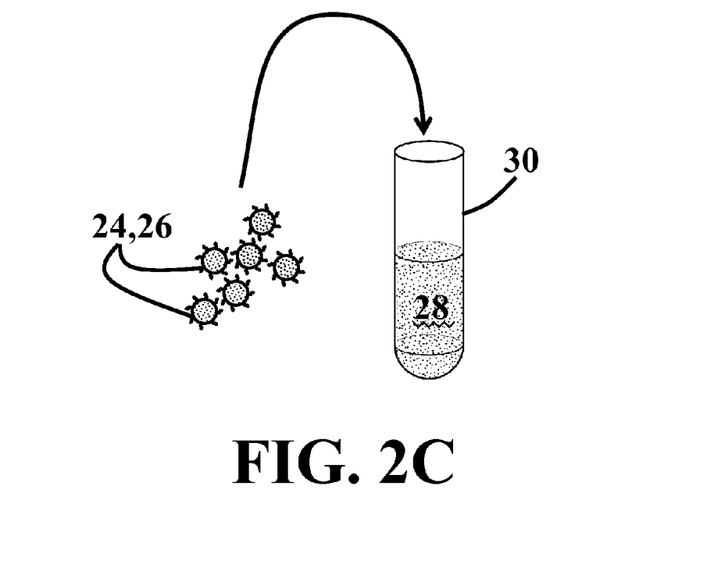

The functionalized silica-coated magnetic nanoparticles 24, 26, as shown in FIG. 2C, are introduced and suspended in a liquid resin solution 28 comprising a plurality of cyanate ester monomers and/or oligomers in a pre-determined shape (Block 32, FIG. 1). The pre-determined shape may be a desired final product comprising the cured polymer or a shape that may be further processed into the desired final product. In any event, and for illustrative purposes, the liquid resin solution 28 is shown to reside within a test tube 30; however, such container should not be considered to be limiting.

Figure 2D:
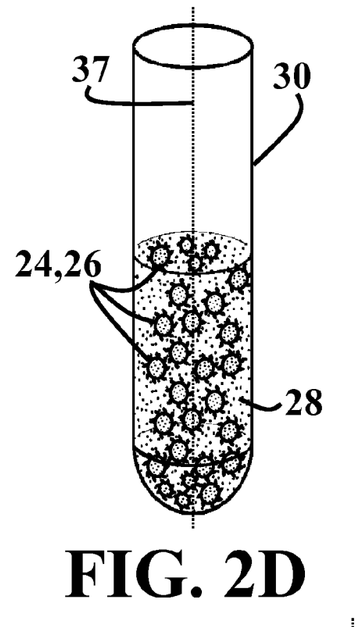
Figure 2E:
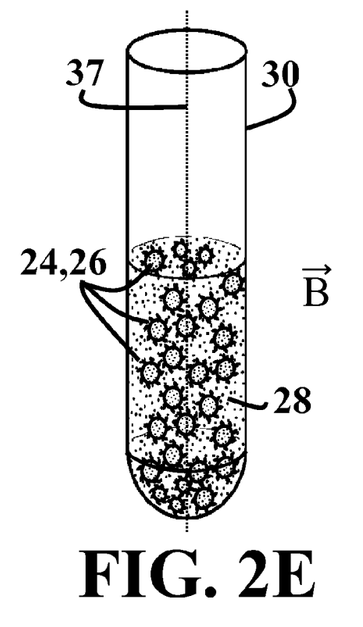

Referring now to FIGS. 1, 2D, and 2E, and with the functionalized silica-coated magnetic nanoparticles 24, 26 suspended in the liquid resin solution 28, a static magnetic field (illustrated herein as "$\vec{B}$") may be applied to the functionalized silica-coated magnetic nanoparticles 24, 26 within the liquid resin solution 28 so as to move the functionalized magnetic nanoparticles to pre-selected positions 34, 36 (Block 38). While the field strength of the magnetic field may vary, according to some embodiments of the present invention, the field strength may range from about 0 Tesla to about 4 Tesla.

The static magnetic field, $\vec{B}$, may comprise a permanent bar magnetic positioned proximate the liquid resin solution 28 and such that a north-south axis (not shown) of the magnetic field is collinear or parallel to a lengthwise central axis 37 of the pre-determined shape (here, the test tube 30). In such embodiments, the magnetic field strength may be proportional to the inverse cube of a distance between the magnet and the liquid resin solution 28. Accordingly, there may exist a magnetic field gradient that is oriented in a direction toward a top portion of the pre-determined shape 30. The functionalized silica-coated magnetic nanoparticles 24, 26 may experience an imbalance of forces configured to accelerate the functionalize silica-coated magnetic nanoparticles 24, 26 in the direction of the magnetic field gradient and as described in A. HUDSON and R. NELSON, *University Physics* 2d ed. 754 (Saunders College Publishing: Philadelphia 1990). The magnetic field gradient in combination with Brownian motion and a negligibly small gravitational force, is configured to concentrate the functionalized silica-coated magnetic nanoparticles 24, 26 proximate the top portion of the pre-determined shape 30. It will be readily appreciated by the skilled artisan having the benefit of the disclosure as provided herein that permanent magnets, electromagnets, or combinations thereof may be arranged so as to produce a net magnetic field gradient and resultant forces sufficient to enable a plurality of arrangements of the functionalized silica-coated magnetic nanoparticles 24, 26 with respect to a dimension of the liquid resin solution 28.

Figure 2F:
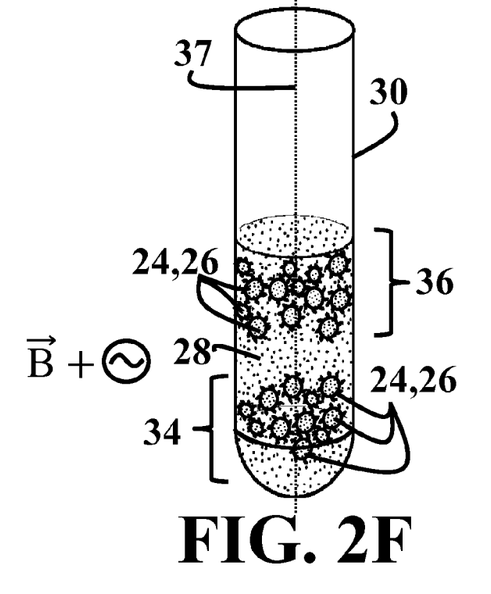

In Block 40, and with the functionalized magnetic nanoparticles 24, 26 appropriately positioned within the liquid resin solution 28 (FIG. 2F), an alternating electromagnetic field (illustrated herein as "⊗") may be superimposed on the static field so as to locally generate heat at a precisely controlled rate at the pre-selected positions 34, 36. A rate of heat generation within the pre-selected positions 34, 36 may be approximately proportional to the localized concentration of the f functionalized silica-coated magnetic nanoparticles 24, 26, the latter of which altering a magnetic susceptibility and, hence, amount of heat generated per nanoparticle 24, 26.

Furthermore, the specific spatial and temporal characteristics of the EM field employed may be varied or controlled during the process, by one skilled in the art having the benefit of the disclosure provided herein, in order to achieve a desired extent of cure within a pre-selected cure time frame while maintaining stable control of the reaction and the physical and chemical properties of the resultant cyanurate networks. For example, the rate of cure of cyanate ester resin may be modeled, which enables the skilled artisan to alter the rate of cure by controlling a spatial or temporal history of temperatures to which the resin is exposed. Exemplary models may include those described in I. HAMERTON et al., "Studies on a dicyanate containing four phenylene rings and polycyanurate blends. 2. Application of mathematical models to the catalyzed polymerization process," *Polymer*, Vol. 44 (2003) 4839-4852 or L. ZHAO et al., "Autocatalytic curing kinetics of thermosetting polymers: A new model based on temperature dependent reaction orders," *Polymer*, Vol. 51 (2010) 3814-3820. In view of such kinetic models, the spatial and temporal history of the temperature at which the resin is exposed may be determined by the spatial and temporal distributions of rate of local heat generation by the magnetic nanoparticles, as described above, and with understanding of unsteady-state heat transfer via conduction, convection, and radiation.

Optionally, during and after the pre-selected cure time, the alternating EM field may be adjusted, removed, or both so as to control a temperature distribution within the liquid resin solution 28 and, thereby, maintain desirable physical characteristics of the liquid resin solution 28 and to control the rate of polymerization (Block 42).

Figure 2G:
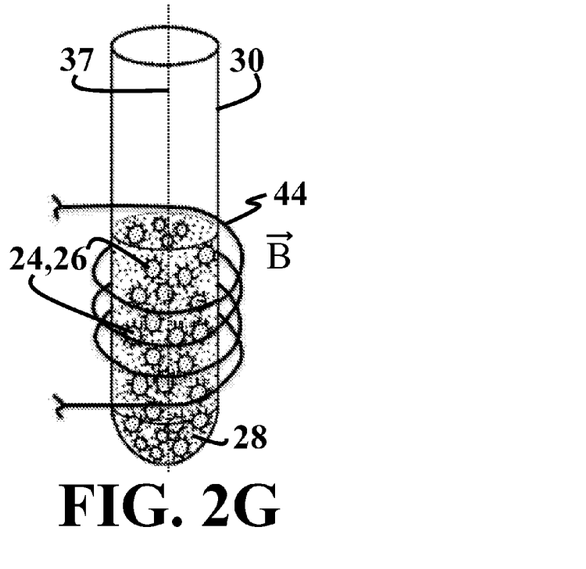

As shown in FIG. 2G, and according to embodiments in which the alternating EM field is produced by a flow of alternating current though a coiled electromagnet 44 surrounding the liquid resin solution 28 (so as to produce a spatially uniform alternating magnetic field), the strength of the alternating EM field, and to a good approximation, the rate of heat generation, may be linearly proportional to the level of alternating current flowing through the electromagnet 44, over a wide range of current values. Thus, by adjusting the level of alternating current flow, the rate of heat generation and, thereby, control of the temperature and rate of cure, may be possible. Such adjustment mechanisms for the cure of cyanate ester resins by magnetic induction are described in J. HUBBARD et al., "Curing of a bisphenol E based cyanate ester using magnetic nanoparticles as an internal heat source through induction heating," *ACS Applied Materials & Interfaces*, Vol. 5 (2013) 11329-11335.

According to additional embodiments of the present invention, numerous variations on the invention as described above are possible, as recognized by the skilled artisan having the benefit of the disclosure provided herein. For instance, reinforcements, fillers, or secondary nanoparticles may incorporated into the liquid resin solution 28 (FIG. 2A) along with the functionalized silica-coated magnetic nanoparticles 24, 26 (FIG. 2B), the reinforcements, fillers, or secondary nanoparticles configured to alter a performance characteristics of the macromolecular networks, as desired. For example, a nanoparticle-filled cyanurate network, such as is provided in P. BADRINARAYANAN and M. R. KESSLER, "Zirconium tungstate/cyanate ester nanocomposites with tailored thermal expansivity," *Composites Science and Technology*, Vol. 71 (2011) 1385-1391. Additionally, the non-coated magnetic nanoparticles may be included in the formulation with the functionalized silica-coated magnetic nanoparticles 24, 26 for the purpose of increasing a total amount of heat generated if the consequent reductions in thermal stability or controlled catalysis characteristics are acceptably small, as determined by one having ordinary skill in the art of formulating resin mixtures and having the disclosure as provided herein.

The silica coating on the magnetic nanoparticles may vary in thickness, uniformity, or both. However, as would be readily apparent to the skilled artisan reading this disclosure, uncoated portions of the magnetic nanoparticle surface may result in a decrease in thermal stability and catalytic control. The extent of such uncoated portions should be limited so as to allow the retention of acceptable thermal and catalytic properties.

Further, it would also be apparent to the skilled artisan reading this disclosure that the rate of heat generated per functionalized silica-coated magnetic nanoparticle 24, 26 is roughly proportional to a volume fraction of the particle occupied by the magnetic core. A thicker coating may limit aggregation, minimize magnetic susceptibility effects, or both, at the cost of decreased heat generation capacity. One skilled in the art of nanocomposite formulations may, therefore, select a coating thickness and uniformity that provides a selected overall balance of these, and other, properties.

As will be also be apparent to one skilled in the art reading this disclosure, the cyanate ester resin formulation may be selected from a variety of single monomers or blends of monomers with multiple functionalities. The liquid resin solution 28 may also include partially polymerized monomers. Such selection of monomer, prepolymers, or both may be guided by the desired physical and chemical characteristics of the liquid resin solution 28 and resultant network.

The liquid resin solution 28 formulation may further incorporate other components, including, for example, monomers with epoxy, unsaturated imide, allylic, and benzoxazine groups that may co-react with cyanate esters to form a macromolecular network. The liquid resin solution formulations may also include inert components, such as toughening agents, stabilizers, tack modifiers, compatibilizers, viscosity control agents, and the like configured to achieve a desired combination of physical and chemical characteristics, as selected by one skilled in the art.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1

Silica coated, magnetic nanoparticles were inductively heated to cure cyanate ester resin. 14 parts per hundred resin of 20 nm (o.d.) hydroxy-functionalized silica-coated magnetic nanoparticles (Nanogap SubNMParticles, A Coruña, Spain) comprising 3 wt % $Fe_2O_3$ by weight with 9 parts per hundred resin of a catalyst comprising 1 part copper (II) acetylacetonate and 29 parts nonylphenol by weight were added to about 300 mg of Primaset® LECy (Lonza Group, Ltd., Basel, Switzerland) and poured into a disc-shaped mold having an open top.

The disc-shaped mold with mixture were placed within a solenoid coil of an induction heater system (Ambrell® Easy-Heat Model 0112, Ambrell, Scottsville, N.Y.) and exposed to an alternating magnetic current induced by an alternating current flow of about 300 A with a frequency of 300 kHz.

A control sample was similarly prepared and held at ambient temperature for 6 hr to ensure that the observed cure was, in fact, due to the inductive heating and not normal catalytic action at room temperature.

The inductively heated mixture became noticeably more viscous after 30 min of treatment with the alternating magnetic current. Within 1 hr, the inductively heated mixture was solid, which indicated that a curing reaction had occurred.

Figure 3:
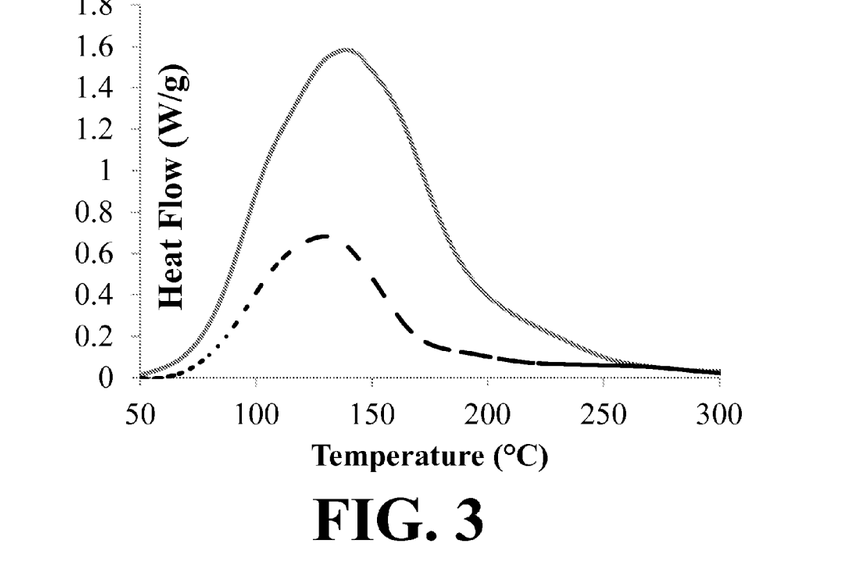
FIG. 3 is a graphical representation of DSC traces for a material cured in accordance with the method of FIG. 1 and a control sample.

A portion of each of the heat-induced, cured material and the control sample was placed in a Differential Scanning Calorimetry ("DSC") pan and temperature scanned to determine the residual heat flow. The DSC trace in FIG. 3 shows the residual heat flow of two systems, one containing silica coated nanoparticles that have been inductively heated (solid line, referred to as "inductively cured sample") and a control sample that has not been inductively heated (dashed line, referred to as "control"). The lower residual heat flow of the inductively cured sample shows that inductively heating silica-coated magnetic nanoparticles induced cure in the cyanate ester resin.

The inductively cured sample was found to have a residual heat of reaction of 27 kJ/mol of cyanate ester moieties. The control was found to have a residual heat of reaction of 84 kJ/mol of cyanate ester moieties, which is within experimental error of about 7 kJ/mol, i.e., the reported enthalpy of polymerization for catalyzed Primaset® LECy. Accordingly, it was concluded that the control underwent no cure.

The difference in measured residual heat of reaction was determined to be due to the presence of significantly more unreacted species in the control as compared to the inductively cured sample, which supports a conclusion that induction heating of the silica-coated, magnetic nanoparticles induced cure in cyanate ester resins.

Example 2

A coating of silica was chemically deposited on a suspension of magnetic nanoparticles. A 0.1 M solution of HCl in Milli-Q deionized water (Millipore Corp., Billerica, Mass.) was prepared. To 20 mL of the HCl solution in a glass vial was added 0.1 g of Iron(II,III) Oxide (magnetite) magnetic nanoparticles (nominal diameter 15 nm) (Skyspring Nanomaterials, Inc., Houston, Tex.). The resulting suspension was de-agglomerated and homogenized by rapid agitation with a Digital Vortex Mixer (VWR, Int'l., Radnor, Pa.) at a speed setting of 500 for 10 min. Excess water was then decanted from the suspension while the magnetic nanoparticles were held in place by attaching a permanent magnet to the bottom of the glass vial, inverting, and allowing the excess water to flow away under the influence of gravity. Following this, approximately 20 mL of Milli-Q deionized water was added to the vial, and the suspension was again agitated and homogenized by vortex mixing at a speed setting of 500 for 10 min. The decanting procedure, described above, was repeated to remove excess water, leaving behind cleaned and wet magnetic nanoparticles.

The cleaned and wet magnetic nanoparticles prepared as described above were added to a 250 mL round bottomed glass flask. Roughly 200 mL of a mixture of 80 parts solvent-grade ethanol and 20 parts deionized water by volume was added to the flask, which was subsequently placed in a water-filled Branson 2510 ultrasonicator (Branson Ultrasonics, Danbury, Conn.) and sonicated for 2 hr. The conditions of sonication were adjusted so as to attain and maintain an equilibrium temperature of 40° C. for the majority of the 2 hr period of sonication. During sonication, a solution of 25% ammonium hydroxide in deionized water was prepared. Immediately after sonication, the flask was removed from the ultrasonicator and, immediately afterword, 1 mL of the ammonium hydroxide solution was added to the flask. Immediately following, a portion of tetraethylorthosilicate ("TEOS") was added. The quantity added was calculated based on the expected density of silica and the volume of coating desired. More particularly, and in one instance, a coating of 7.5 nm nominal average thickness surrounding magnetite cores having a diameter of about 15 nm (considering the density of silica to be 2.5 g/cc, the density of magnetite to be 4.9 g/cc, and the coated and uncoated particles to be spherical, uniform, and pure) was yielded by adding 14.2 g of TEOS per 1 g of magnetite, wherein the conversion of TEOS to $SiO_2$ will yield 4.1 g of $SiO_2$ per 1 g of magnetite.

Immediately following the addition of TEOS, the mixture was returned to the sonicator and sonication resumed and the temperature equilibrated to 40° C. and maintained for 24 hr. At end of the 24 hr, sonication was stopped, the flask was removed from the sonication bath, and excess water and ethanol were decanted using the procedure described above.

The remaining magnetic nanoparticles were then mixed with a few mL of ethanol and poured into another 250 mL beaker. 150 mL of ethanol was then added. The ethanol suspension was then sonicated for 10 min using the same conditions as described above except that no attempt to equilibrate temperatures was utilized. After 10 min, excess ethanol was decanted from the mixture in the manner described above. 150 mL of fresh ethanol were then added to the suspension, which was then sonicated for 10 min more and decanted as described above. Following this, 150 mL of fresh ethanol were added once more to the suspension, followed by 10 min of sonication as before and decanting of excess ethanol as before.

Following the removal of excess ethanol, 150 mL of solvent-grade acetone was added to the suspension. As with the ethanol, the suspension was sonicated for 10 min, excess acetone decanted (as described previously) and replaced with 150 mL of fresh acetone, then sonication was repeated for 10 min followed by decanting (as described above) of excess acetone as before. Following this, 150 mL of fresh acetone were added once more to the suspension, followed by 10 min of sonication and decanting of excess acetone as before.

Following the removal of excess acetone, the suspension was transferred to a 20 mL glass vial. Slightly less than 20 mL of solvent-grade methylene chloride was added to the suspension. As with the acetone, the suspension was sonicated for 10 min, excess methylene chloride decanted (as described above) and replaced with 20 mL of fresh methylene chloride, then sonication was repeated for 10 min followed by decanting (as described above) of excess methylene chloride. Following this, 20 mL of fresh methylene chloride were added once more to the suspension, followed by 10 min of sonication and decanting of excess methylene chloride as described above.

Briefly, and in summary, after decanting of excess ethanol and water, there were three, 10 min cycles of sonication followed by decanting using 150 mL ethanol. This was followed by three 10 min cycles of sonication with 150 mL acetone and, finally, three 10 min cycles of sonication with 20 mL methylene chloride.

After the final decanting of excess methylene chloride, a few mL of fresh methylene chloride were added and the samples stored in a clean 20 mL glass vial until further analysis.

Example 3

Dynamic light scattering ("DLS") measurements of samples prepared in accordance to the method of Example 2 were performed using a Malvern Instruments Zetasizer Nano-ZS instrument (Malvern Instruments Ltd., United Kingdom). Scattered light at 173 nm was measured and used to calculate particle sizes. Samples of silica-coated magnetic nanoparticles in dichloromethane were prepared as in Example 2, except that the 24 hr sonication step was extended so as to last for 30 hr. During the 30 hr sonication step, aliquots of the suspension were removed at 0 hr, 1 hr, 2 hr, 3 hr, 4 hr, and 30 hr after the start of sonication. The solutions were filtered with a 0.2 μm PTFE syringe filter. A viscosity of 1.73 cP was assumed during DLS measurements, which were carried out at 25° C.

Figure 4:
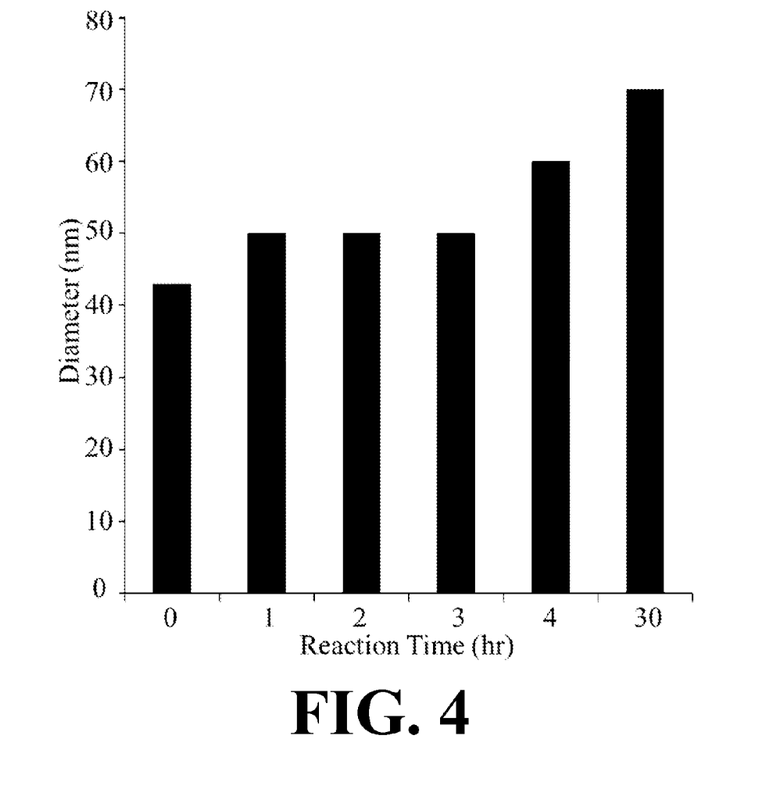
FIG. 4 is a graphical representation of the mean diameter of exemplary silica-coated magnetic nanoparticle diameter as a function of reaction time as determined by dynamic light scattering.

For each run, 3 measurements were taken and averaged to determine the mean particle size as a function of time, which is shown in FIG. 4. As shown in FIG. 4, the particles that started at 43 nm (likely indicating small clusters of the original 15 nm particles) grew to about 50 nm (that is, a coating of around 3.5 nm thick was formed after 1 hr). The particle size then remained unchanged until about 4 hr, indicating that no further growth or aggregation took place. In other words, stable coated particles were formed at about 4 hr. From 3 hr to 30 hr, modest growth was seen, likely due to the slow aggregation or fusing of coated particles.

Figure 5:
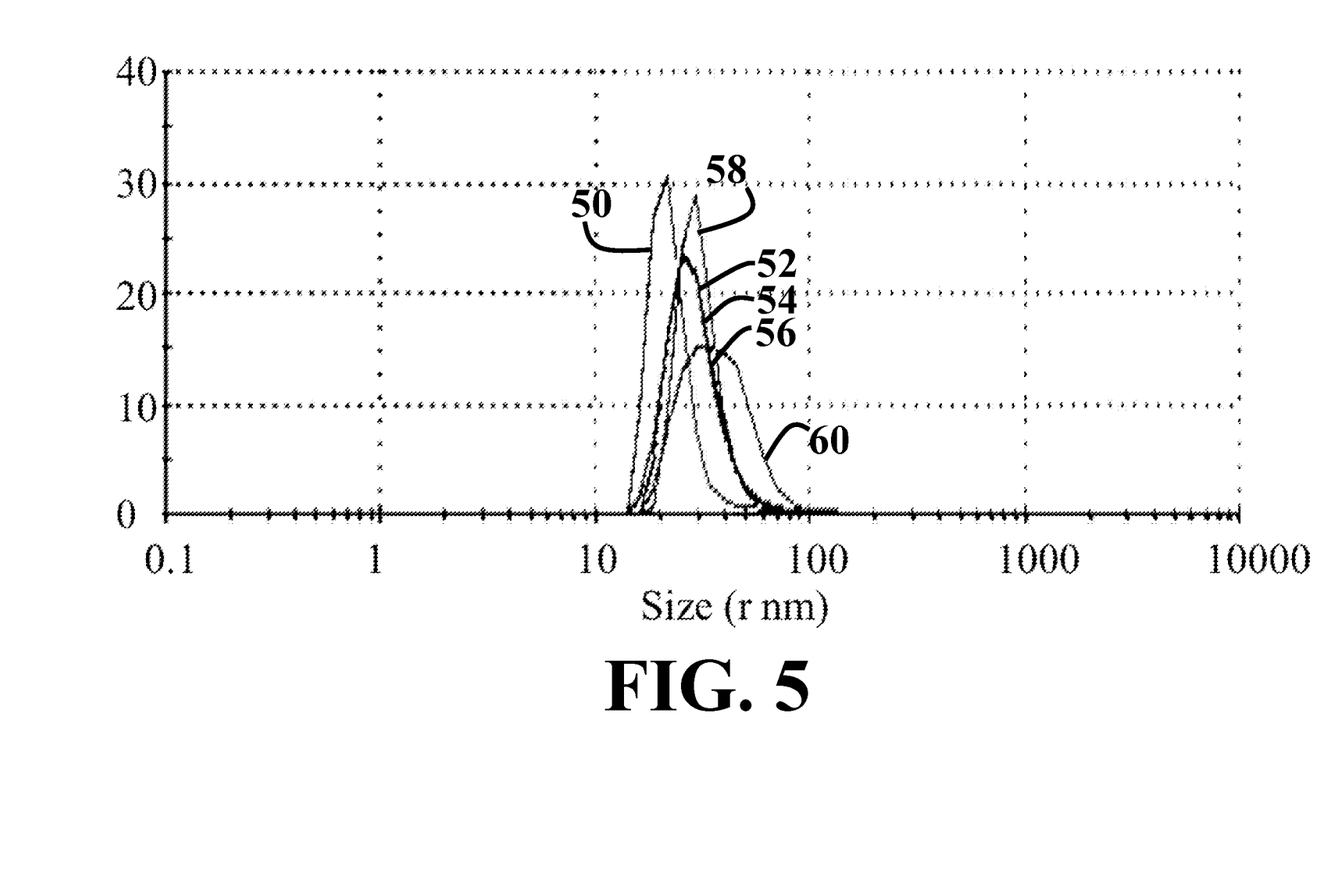
FIG. 5 is a graphical representation of particle size distributions of exemplary silica-coated magnetic nanoparticles prepared in accordance with embodiments of the present invention as a function of time.

FIG. 5 shows actual particle size distributions, as a function of time, determined using DLS, for aliquots taken at 0 hr (line 50), 1 hr (line 52), 2 hr (line 54), 3 hr (line 56), 4 hr (line 58), and 30 hr (line 60). It can be seen that the particle size distribution does not become significantly broader during the course of the reaction, indicating that particle size growth is likely due to the formation of a coating on each individual dispersed aggregate present, rather than to fusion of individual aggregates. At 30 hr, the distribution broadened, indicating that either fusion or additional aggregation had begun.

Example 4

A few drops of the suspension of magnetic nanoparticles, grown in accordance with the method described in Example 2, were transferred via micropipette to a ZnSe substrate and allowed to dry for a few min. Fourier transform infrared spectroscopy (FT-IR) was carried out using a Thermo Corporation Nicolet 6700 spectrometer (Thermo Fisher Scientific, Inc., Waltham, Mass.) in attenuated total reflectance mode with the ZnSe crystal attachment ("silica modified MNPs"). A total of 512 scans were completed on these surfaces with a resolution of 4 cm$^{-1}$ to obtain spectra. For comparison, a few drops of a suspension of magnetic nanoparticles, as-received, were examined using the same procedure ("unmodified MNPs"). A few drops of a suspension of silica nanoparticles (Aerosil R800, Evonik Industries, Essen Germany) were also tested according to the same procedure ("silica NPs").

Figure 6:
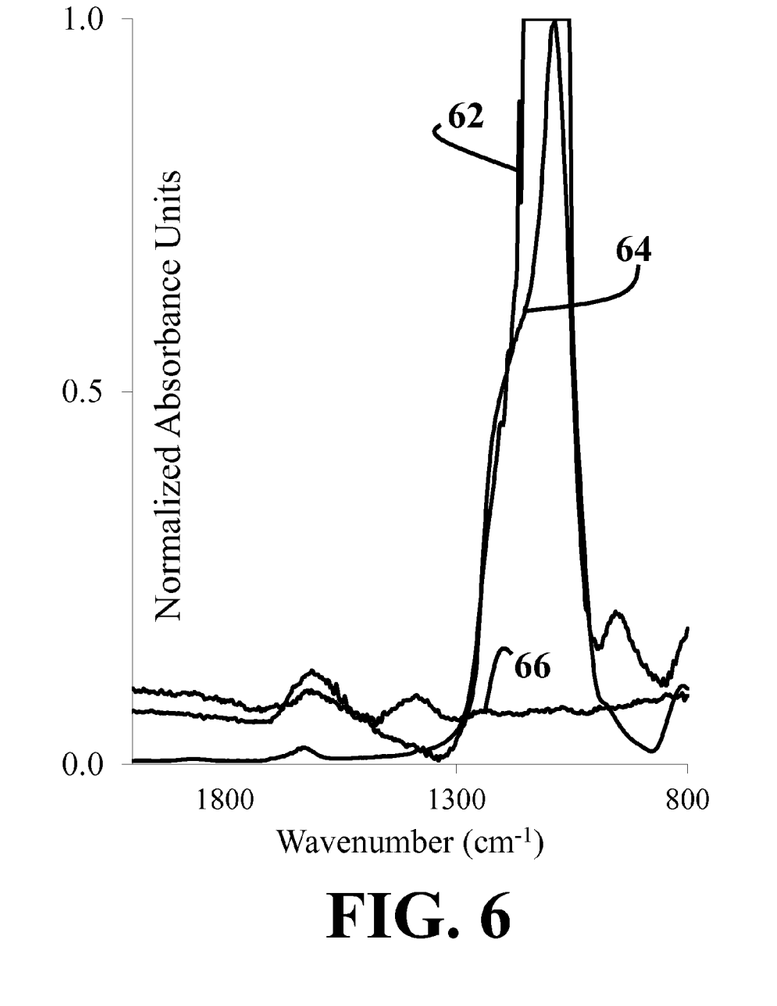
FIG. 6 includes FT-IR spectra of exemplary silica-coated nanoparticles, uncoated nanoparticles, pure silica nanoparticles, and neat resin.

FIG. 6 includes the FT-IR spectra, which demonstrate a very large absorption band, due to Si—O bonds of both the silica NPs (line 62) and in the modified MNPs (line 64). No absorption band was present in the unmodified MNPs (line 66). The spectra of FIG. 6 further demonstrate that silica has indeed been deposited onto the surfaces of the nanoparticles through the procedure described above in Example 2, and that the changes in particle size (noted in Example 3) are not due merely to aggregation of magnetic nanoparticles over time. Instead, changes in particles size are likely due to the deposition of a layer of silica.

Example 5

A portion (typically calculated so as to maintain 0.5 parts of dry particles to 100 parts of cyanate ester resin) of the magnetic nanoparticle suspension in dichloromethane (prepared according to method of Example 2) was added to 1 g of Primaset® LECy, as received from Novoset, Inc. (Peapack, N.J.). The mixture was initially homogenized by simply stirring for a few seconds by shaking the vial by hand. Following this, the vial was placed in the same ultrasonic bath used to prepare the nanoparticles and sonicated, using the same conditions set forth in Example 2, for 1 hr. After sonication, the vial was opened and placed in a vacuum oven (0.05 atm absolute pressure) overnight at 35° C. The vial was then weighed, placed under the heated vacuum for an additional 1 hr, and weighed again. If the weight had decreased by 0.0002 mg or more, the vial was returned to the heated vacuum for 1 hr and re-weighed. The vacuum exposure and weighing cycles continued until a weight change of less than 0.0002 mg was recorded. Once a stable weight was achieved, the suspension was sonicated for an additional 1 hr using the previously described conditions. Samples were curd within 24 hrs of final sonication, or, if they sat for longer, sonication was repeated for 1 hr, within 24 hrs prior to use.

Example 6

Five samples were prepared according to the method described in Example 5 using: 1) nanoparticles prepared in accordance with the method of Example 2 (herein referred to as "silica modified MNPs"); 2) nanoparticles prepared in accordance with the method of Example 2 but without the addition of TEOS (herein referred to as "unmodified MNPs"); 3) Aerosil R800 nanoparticles (Evonik Industries) (herein referred to as "silica NPs"); 4) LECy with no nanoparticles added (herein referred to as "neat LECy"); and 5) LECy catalyzed by a 30:1 mixture of nonylphenol (97%, Sigma-Aldrich, Inc., St. Louis, Mo.) and copper(II) acetylacetonate (ROC/RIC, Research Organic/Inorganic Chemicals Corp., Sun Valley, Calif.), wherein the aforementioned mixture added at 2 parts per weight to 100 parts per weight LECy (herein referred to as "catalyzed LECy"). The LECy mixture is a known catalyst for the cure of cyanate ester resins, as described in M. C. DAVIS et al., "Polycyanurate networks from anethole dimers: synthesis and characterization," *J. Polym. Sci., Part A: Polym. Chem.*, Vol. 50 (2012) 4127-4136.

A droplet (ranging from 8 mg to 10 mg) of each sample was placed in an aluminum DSC pan and sealed. The pans were then heated in a TA Instruments QA 2000 Differential Scanning Calorimeter (TA Instruments, New Castle, Del.) under 50 mL/min flowing nitrogen. The temperature protocol was heating at 10° C./min to 350° C., followed by cooling at 10° C./min to 100° C., then re-heating at 10° C./min to 350° C.

The signals from the second heating were subtracted from those generated during the first heating to provide for baseline correction.

Figure 7:
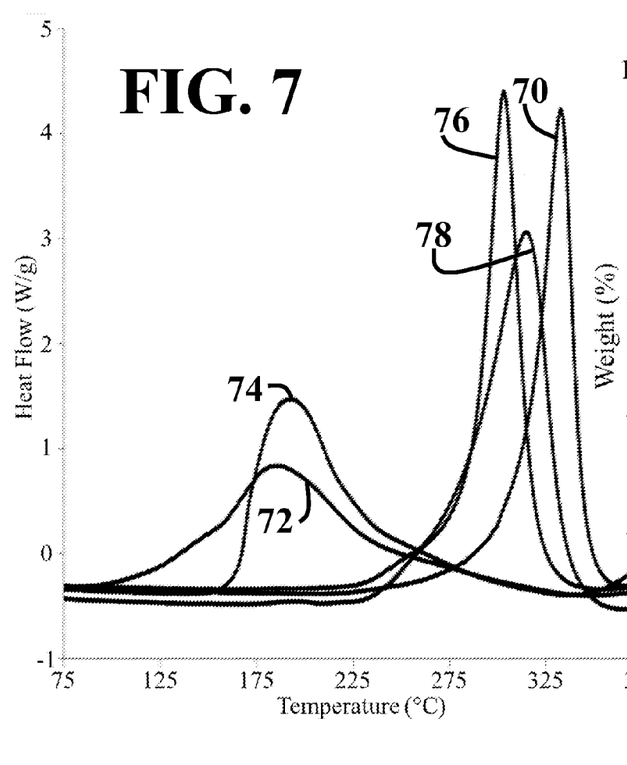
FIG. 7 includes DSC scans of five samples, including, a neat LECy sample, a catalyzed LECy sample, a LECy with unmodified magnetic nanoparticle sample, a LECy with silica modified magnetic nanoparticle sample, and a LECy with silica nanoparticles sample, and indicates relative degrees of catalysis of a cyanate ester resin using methods according to embodiments of the present invention.

FIG. 7 includes resultant DSC scans and is indicative of the degree of catalysis of a cyanate ester resin. The aforementioned fact can be verified easily by comparing the neat LECy sample (line 70) and the catalyzed LECy samples (line 72). The neat LECy sample (line 70) shows a narrow exotherm that peaks at over 325° C., typically of a highly pure cyanate ester. In general, the most commonly encountered impurities in cyanate ester resins act as catalysts for cyanate ester resins, and the peak exotherm temperature is an excellent measure of the degree of catalysis (higher peak temperatures indicate less catalysis).

FIG. 7 further demonstrates that the unmodified MNPs (line 74) provide a catalytic effect very similar to the catalyzed LECy (line 72), whereas the silica modified MNPs (line 76) provide only a small effect, similar to that of nanoparticles composed entirely of silica NPs (line 78). In essence, these data show that the cyanate ester resin "sees" a silica surface on the nanoparticles prepared according to the method of Example 2, rather than the original magnetite surface of the unmodified MNPs. The coating of silica greatly curtails the catalytic activity of the nanoparticles, allowing for much greater control over the temperature at which the polymerization is initiated. Further additions of catalyst can be used to lower the initiation temperature as desired, but initiation temperatures higher than those shown on the DSC trace are not possible.

Example 7

Five samples prepared according to the method of Example 6, cured at 290° C., and then were placed separately in a TA Instruments Q5000 Thermogravimetric Analyzer under a flow of 60 mL/min of air. The temperature was then ramped at 10° C./min to 800° C. and the weight loss recorded.

Figure 8:
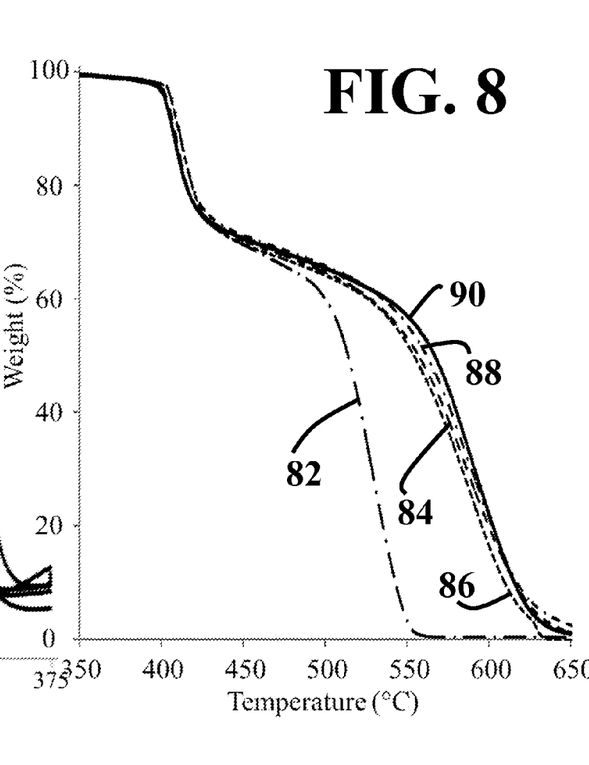
FIG. 8 is a graphical representation of a rate of weight loss observed while heating of exemplary resins prepared in accordance with embodiments of the present invention and control resins.

FIG. 8 is a graphical representation of the weight loss observed between 350° C. and 650° C. The unmodified MNPs (line 82) severely reduce the thermo-chemical stability compared to either the neat LECy (line 84) or the catalyzed LECy (line 86).

The data of FIG. 8 illustrate one important shortcoming of the use of uncoated magnetic nanoparticles in formulations with cyanate ester resins: that is, the addition of silica NPs (line 88) improved the thermo-chemical stability slightly, allowing for slightly greater quantities of the resin to avoid being volatilized at elevated temperatures. The silica modified MNPs (line 90) perform even better than the nanoparticles made entirely of silica NPs (line 88). Although it is difficult to attribute the causes of the slight differences in performance seen among the neat LECy (line 84), the silica NPs (line 88), and the silica modified MNPs (line 90), it is clear that the silica modified MNPs (line 90) behave very similarly to the silica NPs (line 88), and completely mitigated the loss in thermo-chemical stability seen when unmodified MNPs (line 82) were used.

Example 8

Silica-coated magnetic nanoparticles, prepared according to the method of Example 2 and mixed with LECy according to the method of Example 5. A control sample was prepared by providing LECy with no nanoparticles added.

To each of these samples was added 3 parts per hundred by weight of a catalyst mixture consisting of 1 part Copper(II) acetylacetonate (ROC/RIC, Sun Valley, Calif.), and 30 parts nonylphenol (97%, Sigma-Aldrich, St. Louis, Mo.). The samples were homogenized by stirring in a 6 mL glass vial for a few min. The samples were then placed within the interior of an insulated copper coil containing 8 turns of wire across a span of 4 cm and a mean diameter of 3 cm. The samples containing nanoparticles were then exposed to a 192 kHz alternating current of 100 amp, 200 amp, and 260 amp. The control sample was also exposed to a 192 kHz alternating current of 260 amp (wherein, the measured power input for samples exposed to the 260 amp alternating current was 722 W). The current was maintained for up to 30 min and the temperature measured by means of an alcohol thermometer placed on the top surface of the samples.

Figure 9:
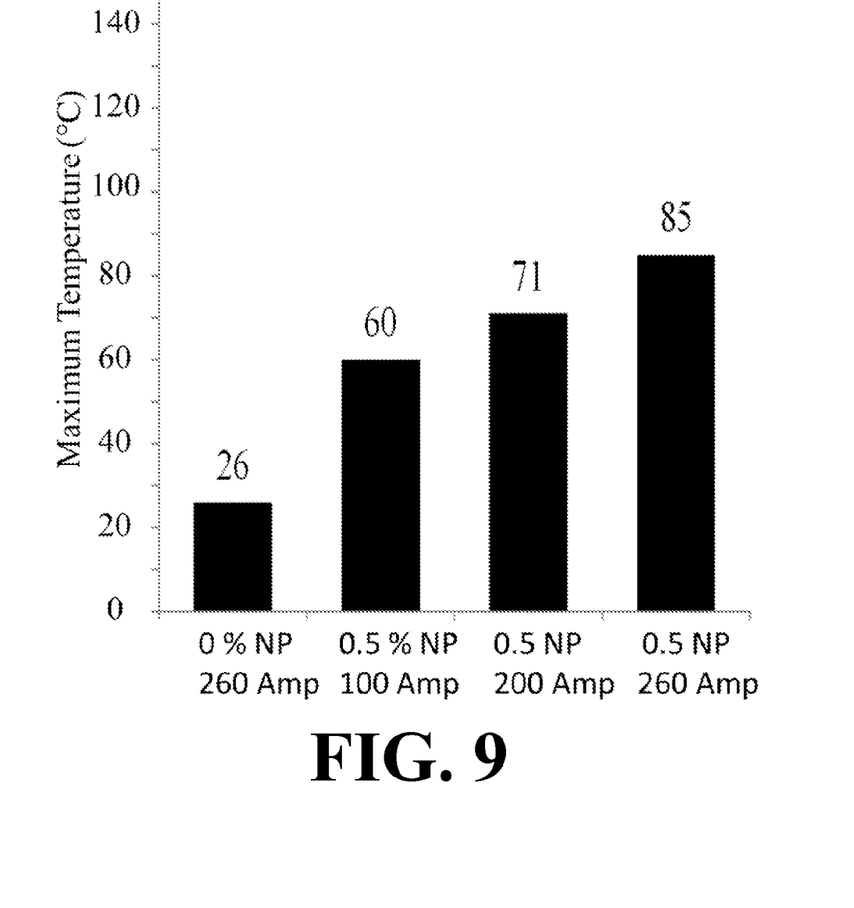
FIG. 9 is a graphical representation of maximum temperatures observed in exemplary resins prepared in accordance with embodiments of the present invention and control resins.

Maximum temperatures observed are shown in FIG. 9 and range from 26° C. (very near ambient) for the control sample with no nanoparticles (likely heated slightly from heating in the surrounding coil) to 85° C. for the sample containing 0.5 wt % nanoparticles and exposed to 260 amp. A sample heated under these conditions was allowed to remain exposed to the alternating current for 8 hr, during which time it solidified into a black glass, a reliable indication that conversion of at least about 65% was achieved (see Example 1).

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method for curing a macromolecular cyanurate network, the method comprising:
    suspending a plurality of functionalized silica-coated magnetic nanoparticles in a resin mixture, the resin comprising cyanate ester monomers, cyanate ester oligomers, or both;
    applying a static magnetic field to the plurality of functionalized silica-coated magnetic nanoparticles in the resin mixture; and
    imposing an alternating electromagnetic field having a frequency ranging from about 1 kHz to about 10 MHz on the static magnetic field to cure.

2. The method of claim 1, wherein the time of cure ranges from about 1 m in to about 1000 hr.

3. The method of claim 1, wherein a north-south axis of the static magnetic field is collinear or parallel to a lengthwise central axis of the resin mixture.

4. The method of claim 1, wherein a strength of the static magnetic field ranges from about 0 Tesla to about 4 Tesla.

5. The method of claim 1, further comprising:
    removing the alternating electromagnetic field and the static magnetic field after the cure time.

6. The method of claim 5, further comprising:
    after removing the alternating electromagnetic field, adjusting a temperature of the macromolecular cyanurate network for controlling a character of the macromolecular cyanurate network.

7. The method of claim 1, wherein the magnetic nanoparticles of the plurality comprises magnetic nanoparticles coated with silica by a chemical deposition process.

8. The method of claim 7, wherein the functionalized, silica-coated magnetic nanoparticles include a core comprising iron oxide and a layer comprising silica.

9. The method of claim 8, wherein the core has a diameter ranging from about 1 nm to about 50 nm and the layer has a thickness ranging from about 1 nm to about 50 nm.

10. The method of claim 1, wherein each of the plurality of functionalized magnetic nanoparticles have a diameter ranging from about 10 nm to about 200 nm.

11. A cast article comprising a macromolecular cyanurate network cured in accordance with the method of claim 1.

12. A method for preparing a macromolecular cyanurate network, the method comprising:
   functionalizing a plurality of magnetic nanoparticles, each of the magnetic nanoparticles of the plurality having a layer comprising silica;
   suspending the plurality of functionalized magnetic nanoparticles in a resin mixture, the resin comprising cyanate ester monomers, cyanate ester oligomers, or both;
   applying a static magnetic field to the plurality of functionalize magnetic nanoparticles in the resin mixture;
   imposing an alternating electromagnetic field on the static magnetic field for a cure time, wherein the alternating electromagnetic field has a frequency ranging from about 1 kHz to about 10 MHz;
   removing the alternating electromagnetic field and the static magnetic field after the cure time; and
   adjusting a temperature of the macromolecular cyanurate network for controlling a character of the macromolecular cyanurate network.

13. The method of claim 12, wherein the cure time ranges from about 1 min to about 1000 hr.

14. The method of claim 12, wherein a north-south axis of the static magnetic field is collinear or parallel to a lengthwise central axis of the resin mixture.

15. The method of claim 12, wherein a strength of the static magnetic field ranges from about 0 Tesla to about 4 Tesla.

16. The method of claim 12, wherein the plurality of functionalized magnetic nanoparticles include a core comprising iron oxide and a layer comprising silica.

17. The method of claim 12, wherein each of the plurality of functionalized magnetic nanoparticles have a diameter ranging from about 10 nm to about 200 nm.

18. A cast article comprising a macromolecular cyanurate network cured in accordance with the method of claim 12.

* * * * *